UNITED STATES PATENT OFFICE.

JAMES J. McTIGHE, OF FREEPORT, PENNSYLVANIA.

ARC-LIGHT CARBON.

SPECIFICATION forming part of Letters Patent No. 392,520, dated November 6, 1888.

Application filed February 24, 1886. Serial No. 193,051. (No specimens.)

*To all whom it may concern:*

Be it known that I, JAMES J. McTIGHE, a resident of Freeport, county of Armstrong, and State of Pennsylvania, have invented a new and useful Improvement in the Manufacture of Carbon Pencils for Electric Lighting, which improvement is fully set forth in the following specification.

This invention relates to the manufacture of carbons for electric-lighting purposes, and has for its object the production of pencils or electrodes possessing in high degree those properties that tend to efficiency and economy in use.

In an application for Letters Patent filed by me August 24, 1883, and numbered 104,628, I have described the manufacture of a hard, dense, homogeneous carbon obtained by the treatment of natural gas in a closed retort. This carbon has certain marked characteristics that clearly distinguish it from other forms of hard carbon, as fully set forth in the specification forming part of my aforesaid application, to which reference may be had for a full description of the said natural-gas hard carbon and the manner or process of making the same. I have found that the said natural-gas hard carbon possesses properties rendering it particularly valuable in the manufacture of carbon pencils for electric lighting, and its use for that purpose constitutes a special feature of the present invention. This product is found, in comparison with other carbons, to possess high electric conductivity; hence when pencils made therefrom, as hereinafter described, are used for electric lighting, a relatively small resistance is introduced into the circuit, effecting great economy in the working of the system. The durability of the carbon pencil still further conduces to economy in use. It is also found that this natural-gas hard carbon burns with great brilliancy and steadiness and (unlike other forms of carbon) without flame or sputtering, which characteristic is believed to be due, mainly, to the absence of occluded gases, such as are retained in the ordinary gas-retort carbon formed in the manufacture of illuminating-gas, and to the absence of such impurities as sulphur and silicates present in the coke ordinarily used in making such pencils.

My invention further includes the baking of the carbon pencil in an atmosphere of natural gas, which has proved a very valuable improvement in the manufacture of such articles. This natural gas has, as fully set forth in application before referred to, a peculiar composition, differing radically from ordinary hydrocarbon gases, such as have been hitherto used for this purpose.

In order that the invention may be fully understood and practiced, I will describe in detail one manner in which the same may be carried into effect.

I take the natural-gas hard carbon and reduce it any suitable way to a granulated or pulverulent state. In this condition it exhibits marked adhesive properties or "tooth," enabling it to be effectually and easily mixed with a proper binder and formed into a tenacious mass. This property further serves to distinguish it from ordinary gas-retort or graphitic carbon. The granulated or pulverulent mass is then mixed with a suitable binding agent. A viscous hydrocarbon, as tar, will answer well for this purpose; or any liquid hydrocarbon or other suitable material may be used. The mass, when brought to a proper state of consistence, is put into molds of the desired form and subjected to pressure, or the shaping is effected by the use of a hydraulic press and die. The article, after molding and pressing, is very compact, and the particles throughout adhere with great tenacity.

The pencil or article is completed for use by baking in an atmosphere of natural gas. This is best done in a highly-heated closed retort, the source of heat being external and the air excluded, and it may advantageously continue for from forty-eight to seventy-two hours. Its effect is to produce in and upon the pencil or article a very dense coherent deposit of carbon of the peculiar kind and possessing the characteristics and properties of that described in my aforesaid application. The pencil thus produced is one of great hardness, density, and strength throughout, black in color externally, and having a hard skin, which acts similarly to a metal plating, in that, being difficult to effect combustion, the carbon near the arc does not form a long taper, but holds its thickness well up to the arc. The non-porosity of the pencil precludes the presence of gases, and this has an important bearing on the behavior of the light. When gases are occluded in a pencil, they produce "blows," which carry the arc up the side of the positive, making it flame. This not only diminishes the light enormously, but also reduces the resistance of the arc, which in a well-regulated lamp results in the pulling of a longer arc, the combined effect being to maintain a bluish light. With my carbon pencil, on the contrary, there is no tendency to blow and no tendency to flame, and in consequence the crater on the positive is of uniform size and shape, and the whole energy of the current used at the arc is almost entirely expended in heating the crater to the most intense temperature. The final result of this is a pure white, most intense light, greater in proportion to the electrical energy expended than is attainable with the present carbons of commerce. This result is also assisted by the total absence of all impurities—such as sulphur, silicates, and other earthy matters, as well as metals—which in the great heat of the arc, in case they are present in the carbon, volatilize into gases and become "blowers."

I claim as my invention—

1. As an article of manufacture, a pencil or electrode for electric lighting, formed of natural-gas hard carbon having the properties and characteristics set forth.

2. The process of forming carbon pencils or electrodes by mixing granulated natural-gas hard carbon with a suitable binder, molding and pressing into shape, and finally baking in an atmosphere of natural gas, substantially as described.

In testimony whereof I have signed this specification in presence of two subscribing witnesses.

JAMES J. McTIGHE.

Witnesses:
THOS. J. McTIGHE,
CHAS. S. WIENERHOLD.